July 3, 1934.  F. S. HODGMAN  1,965,378
SENSITIVE REMOTE CONTROL SYSTEM AND AUTOMATIC PILOT
Filed April 14, 1931  2 Sheets-Sheet 1
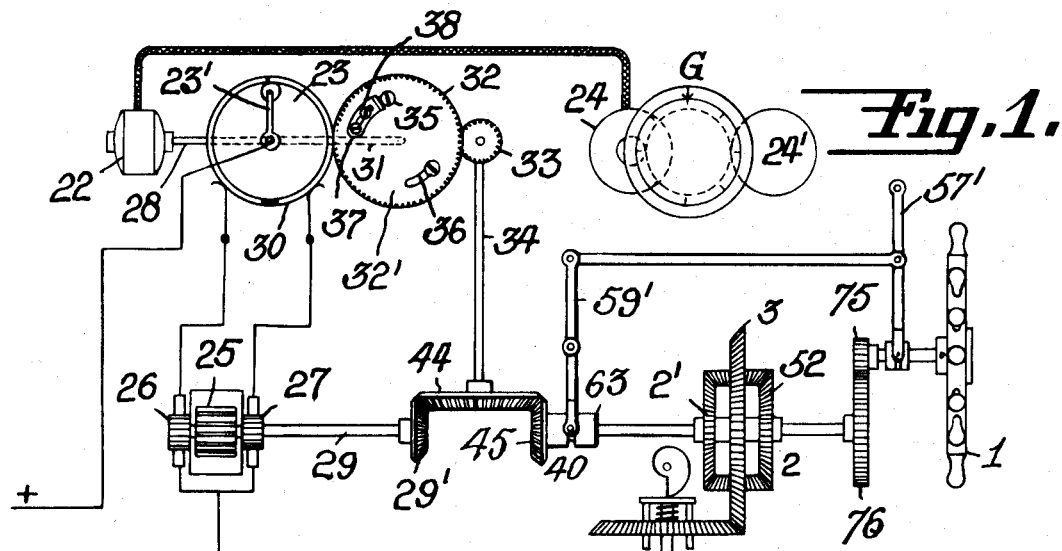
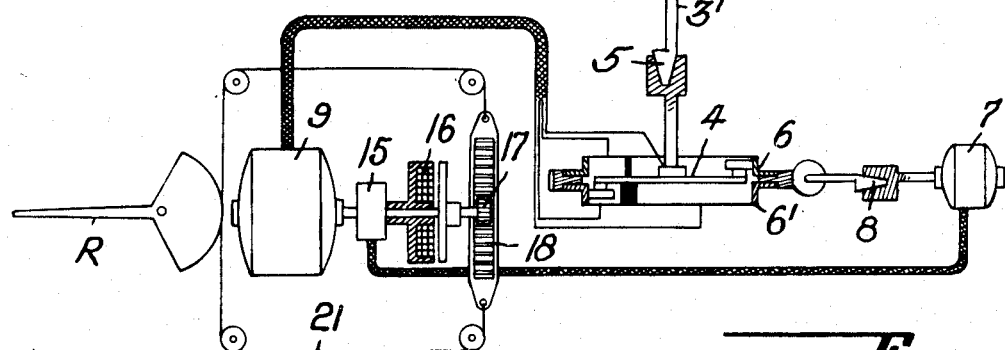
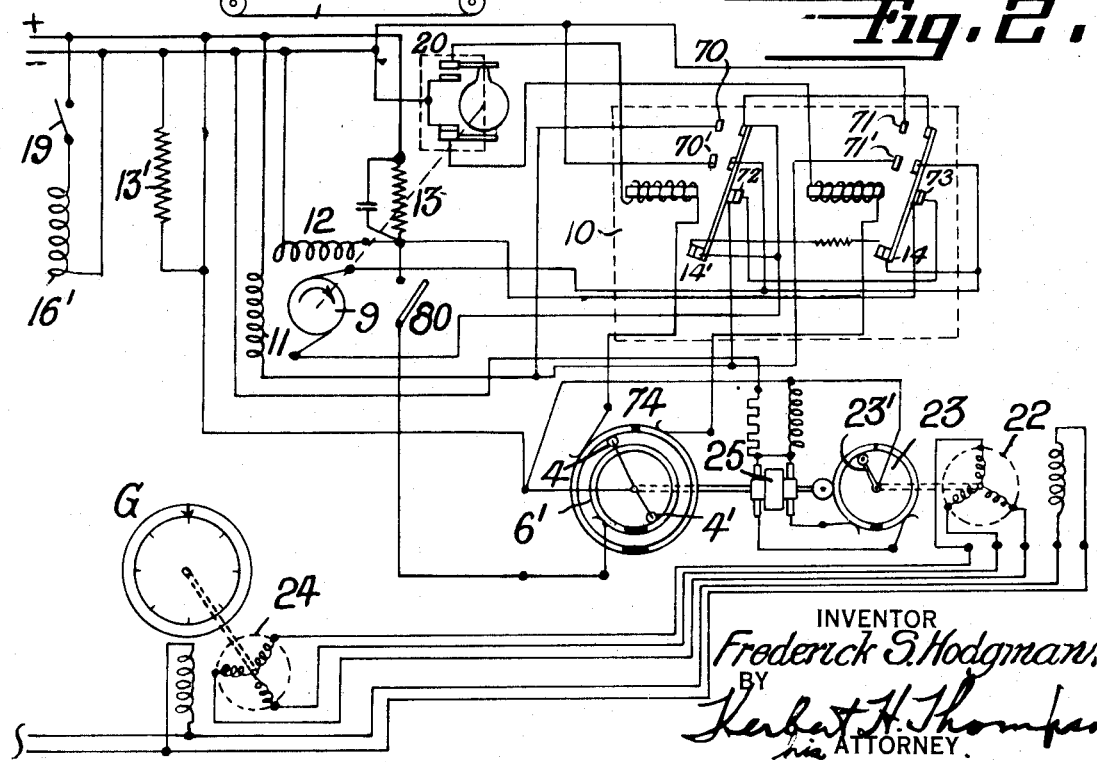
INVENTOR
Frederick S. Hodgman,
BY
Herbert H. Thompson
his ATTORNEY.

July 3, 1934.  F. S. HODGMAN  1,965,378
SENSITIVE REMOTE CONTROL SYSTEM AND AUTOMATIC PILOT
Filed April 14, 1931  2 Sheets-Sheet 2
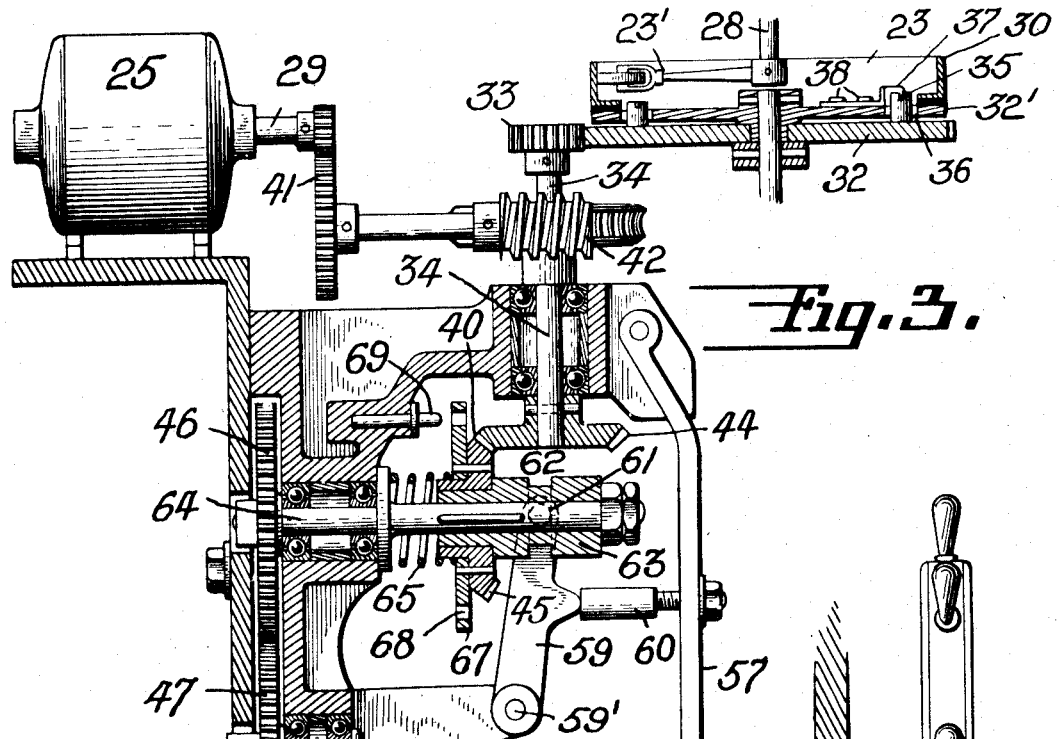
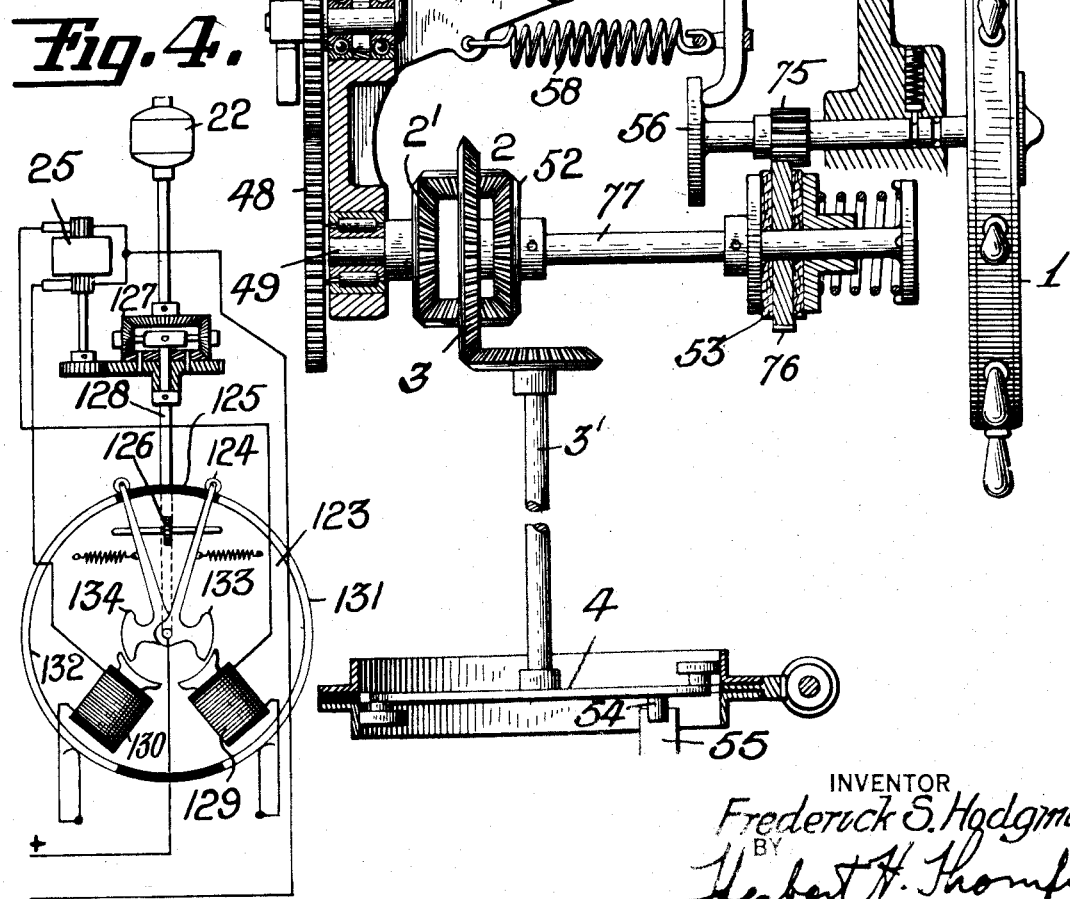
INVENTOR
Frederick S. Hodgman,
BY
Herbert H. Thompson
his ATTORNEY Patented July 3, 1934

1,965,378

UNITED STATES PATENT OFFICE 1,965,378

SENSITIVE REMOTE CONTROL SYSTEM AND AUTOMATIC PILOT

Frederick S. Hodgman, Glen Rock, N. J., assignor to Sperry Gyroscope Company, Inc., Brooklyn, N. Y., a corporation of New York Application April 14, 1931, Serial No. 529,939

15 Claims. (Cl. 172—282)

This invention relates to automatic steering devices for ships or other dirigible craft. In the ordinary automatic steering device a repeater motor actuated from the gyro compass turns a multi-part controller, another part of which is turned by the follow-up devices and still another part by a course changing device or hand wheel. This controller usually actuates a reversible power motor of sufficient horsepower to either turn the rudder directly itself or to operate the valve of the hydraulic or steam steering engine. While such a system is satisfactory for most ships, for high speed ships or where exceptionally accurate steering is desired, I have devised a very sensitive control which will actuate the rudder for a deviation from course of a few minutes of angle, whereas the ordinary ship's steering device is not actuated under one half to three quarters of a degree deviation. I prefer to construct my invention as an attachment for standard steering gear, such as outlined above, and instead of turning one part of the master controller directly from the compass repeater motor I interpose a very sensitive auxiliary controller between the compass and master controller. Operated from this controller is a very small power motor having an armature with small moments of inertia. The auxiliary controller may, therefore, handle very small currents and have a narrow space between sectors, so that the small power motor will start to operate practically as soon as the controller is moved and will stop very quickly when the current is shut off. This auxiliary motor operates the contacts on the master controller and also a follow-up system back to the auxiliary controller. I interpose a lost motion or other time lag device in this follow-up system so that a large movement of the motor is obtained for the first increment of deviation of the ship, at least sufficient to move the master controller off the dead sector.

Other objects and features of the invention will become apparent from the following description.

Referring to the drawings illustrating one form my invention may assume,

Fig. 1 is a diagrammatic layout of an automatic steering gear for ships with my invention applied thereto.

Fig. 2 is a wiring diagram of the same.

Fig. 3 is a sectional view showing the actual construction that the newer portions of my invention may assume.

Fig. 4 is a diagram illustrating one of the many modifications my invention may assume.

Referring first to Fig. 1, the lower portions of the figure will be recognized as representing a conventional automatic steering device. The usual handwheel for course changing and manual steering is shown at 1, the usual differential gearing connecting the handwheel and repeater compass is shown at 2, and the combined movements of the two are transmitted through planetary gear 3 to the shaft 3', which is shown as turning the trolley arm 4 of the master controller through adjustable lost motion connection 5, usually known as the "weather" adjustment. The contactor rings 6 in this instance are rotated from the follow-up repeater motor 7 through the usual lost motion device 8, generally known as the "tele-motor" adjustment. The master controller governs the power motor 9 through a system of relays 10. As shown in the wiring diagram, the motor is of a two-speed compound-wound type having a series field 11, a shunt field 12, speed regulating resistor 13 and field discharge resistor 13'.

For small yawing angles the motor is operated at full speed but for large yawing the speed is usually cut down in order to reduce the wear and tear on the steering engine. This is effected when the auxiliary trolley 4' on the trolley arm comes in contact with the lower live sector 6' of the controller. When switch 80 is closed, this short circuits series resistance 13, strengthening the field and reducing the motor speed. The motor is preferably braked dynamically, the braking effect being controlled from back contacts 14—14' on the main relay switches on the panel 70, 70' and 71—71'. The follow-up repeater motor 7 may be actuated from the transmitter 15 driven from the motor 9 (Fig. 1).

There is also provided an electro-magnetic clutch 16 between the motor shaft and the pinion 17 which drives the rack bar 18 so that if steering directly by the main hand wheel (not shown) the motor may be disconnected as by switch 19 in circuit with the coil 16' of the clutch. A limit switch for preventing jamming of the steering engine is shown at 20. The rack bar 18 may move the rudder R directly as by rudder cables 21 or it may operate the same through any suitable form of steering engine. Most of the above parts are now standard and form no part of the present invention per se, with the exception of a means for increasing the effectiveness of the dynamic braking.

As above stated, however, on account of the inertia of the large motor 9 in starting, its large moment of inertia in stopping and the necessity for handling fairly heavy currents therefor, such a system does not give as close steering as desired on certain types of vessels, since if direct control is used, the dead section on the controller is usually 20 to 30 compass minutes wide to prevent the motor from carrying it beyond the dead section when stopping. Instead of operating, therefore, the arm 2' of the differential 2 from a compass repeater motor, I prefer to interpose an additional super-sensitive controlling means between the compass repeater motor 22 and the master controller. This means preferably comprises a small auxiliary controller 23 operated in part from the aforesaid motor 22 as by having the trolley arm 23' thereof turned from said motor. It should be observed that the motor 22 is driven from the fine transmitter 24 on the master compass G so that the repeater shaft 28 is revolved many times for one complete turn around of the ship, or in other words, the repeater arm is moved through a very much greater angle for a given angular deviation of the ship. The dead section on this commutator may, therefore, be made as little as 5 compass minutes. That is, a turn of the ship through a 5 minute angle away from its course will always start the motor. The coarse transmitter is represented at 24'.

The controller 23 actuates a small, light reversible motor 25. In order to avoid the use of relays which introduce a slight time lag, I prefer to connect each sector of the controller to a separate winding on the armature of the motor 25, two commutators 26—27 being provided for this purpose and the windings being opposed so that one winding drives the motor in one direction and the other winding in the opposite direction. The shaft 29 of the motor 25 then operates the master controller instead of the usual compass repeater motor and for this purpose it is shown as geared to the arm 2' of the differential 2. The armature of the motor 25 preferably also has a short circuited squirrel cage construction so as to be self-damping. Motor 25 also drives in part the controller 23 so as to furnish a follow-up for the controller. As shown the contacts 30 are mounted on the shaft 31 of the gear 32, which gear is rotated from pinion 33 on a stub shaft 34 geared through suitable reduction gearing 29', 44 to the motor shaft 29.

A lost motion or other mechanical or electrical equivalent is also preferably incorporated in the follow-up system so that the initial movement of motor 25 in each direction, after reversal, will be much greater than subsequent movements in the same direction. This accomplishes the dual function of yaw-preventing as set forth in the prior patent to Elmer A. Sperry, No. 1,695,615, dated December 18, 1928, and moving the main controller 4 off its dead section to start motor 9 promptly to cause a large initial rudder movement. This may be accomplished by having the gear 32 loosely mounted on the shaft 31 and connected to a disc 32' (Fig. 3) lying thereover by pins or set screws 35 passing loosely through slots 36 in the disc. The extent of this lost motion may be varied by plate 37 adjustably secured to the face of the gear as by set screws 38 passing through a slot in the plate, the forward end of the plate being used as a limit stop for the set screw 35.

I also prefer to provide a clutch 40 or other detachable connection between the motor 25 and the master controller so that when steering by hand the auxiliary controller may be entirely cut out. The preferred mechanical construction for the clutch and associated parts is shown in Fig. 3 where the parts already described will be recognized by like reference characters. As shown in this figure, the parts are in position for automatic steering with the master controller being operated from the motor 25 through multiplying gear 41, worm and worm wheel 42, shaft 34, bevel gears 44 and 45 and successive spur gears 46, 47, 48. On the shaft 49 of gear 48 is mounted bevel gear 2' of the differential gear train 2 which drives through lost motion devices (not shown) the trolley arm 4. The hand wheel drive is shown as effected through pinion 75 on the shaft of the hand wheel meshing with gear 76 on the shaft 77 of the bevel gear 52 of the gear train. The course may be changed at any time through the hand wheel. It should be noted that in changing the course through the handwheel 1 that the main controller 4 is set directly from the handwheel and not through the auxiliary controller including the lost motion connections 35, 36. This has the advantage that the helm responds directly and proportionally to movements of the handwheel without interference from the lost motion device and without the necessity for providing separate means for cutting out the lost motion device as has previously been proposed. Preferably a slip friction clutch 53 is provided between the gear 76 and the shaft 77 so that when the lug 54 on the trolley arm 4 strikes the stop 55 and the controller can be turned no farther, the hand wheel will slip and not jam the controller.

When it is desired to steer through wheel 1 without interference from the compass, the hand wheel is axially pushed to the left in Fig. 3. This moves the disc 56 attached to the shaft thereof to the left which permits the lever 57 to be drawn to the left by tension spring 58. This rotates the forked arm 59 counter-clockwise about its pivot 59' by the engagement of the adjustable member 60 on the lever 57 with a projection on fork 59. Pins 61 project inwardly thereon from the fork and rotatably but non-slidably engage a circumferential groove 62 on a sleeve 63 splined to the shaft 64 of bevel gear 45, the bevel gear being mounted on said sleeve. Said sleeve and gear are normally held to the right in Fig. 3 by the compression spring 65 so as to hold the bevel gears 44 and 45 in mesh. When, however, the fork 59 is rotated counter-clockwise in Fig. 3 the bevel gears are disengaged and the compass control severed. I also preferably lock this gear train so that it will not be rotated backwards when the handwheel 1 is turned. For this purpose I have shown a disc 67 secured to the rear face of the bevel gear 45 and having a number of holes 68 therein. When the bevel gear is moved to the left, one of said holes engages a pin 69 fixed to the framework so that the bevel gear is securely locked, thus locking the arm 2' of the differential.

In order to further increase the sensitiveness of the apparatus and to keep the width of the insulation between the live sectors on the master controller a minimum, I also provide switches 72—73 on the panel which are open when the motor is running, but both of which close when the motor supply is shut off by the controller 4. When these switches are closed the resistance 13 is short-circuited so that the maximum motor field strength is secured for maximum dynamic braking. This brings the motor to rest very quickly so that the width of the insulation 74 in the master controller may be kept small.

The operation of my device is as follows: When the ship is exactly on the course, trolleys 23' and 4 both stand on the insulated section, the insulated section of the former being very narrow. At the first increment of deviation from the course, trolley 23' is moved on to one of the live sectors 30 of ring 23. This causes motor 25 to turn until the lost motion at 36 is passed through and until the ring 23 is turned to the position of the trolley. This lost motion is preferably adjusted so that it is at least great enough to cause the motor 25 to move the trolley 4 off the insulated dead section of controller 4 and thus to actuate the power motor 9 whenever there is a reversal in the direction of yaw, i. e., in the direction of rotation of motor 25. Thus a very accurate positional control is obtained without hunting. The lost motion of devices 36 may also be made great enough to give the initial rudder action necessary in an automatic steering device or the latter may be obtained through the ordinary lost motion device 8. Since the motor 25 may be made very small and with a light armature, very much quicker response and stop may be obtained and the ship held to its course within a few minutes of arc.

It is, of course, obvious that my invention may assume many forms and may be applied to many different types of automatic steering devices and other remote control devices. Thus, instead of securing the joint actuation of the controller from the compass and rudder follow-up by connecting the compass (say) to the trolley and the follow-up to the contact rings, it is obvious that one of these parts (say) the contact ring, may be stationary and both the compass control and the follow-up control connected to the movable element through a differential. It is also obvious that other types of delayed action device than a lost motion in the follow-up system may be employed in the auxiliary controller for securing the initial quick throw of the master controller and rudder.

Fig. 4 illustrates diagrammatically a modification embodying both of the above suggested modifications. In this figure the contactor ring 123 may be made relatively stationary. The trolley element is shown as comprising a pair of spaced trolleys 124, the distance between which may be adjusted to almost equal the width of the insulated section 125 as by means of the threaded shaft 126 connecting the trolleys. The trolleys are normally turned by the differential action of the compass repeater motor 22 and the small follow-up motor 25, a differential gear 127 being provided for this purpose.

Instead of providing lost motion in the follow-up system I provide, in this instance, an overthrow device for the trolleys. This may be accomplished by mounting the trolleys with a limited slip friction connection on the shaft 128 and by providing a pair of fixed electro-magnets 129 and 130 in circuit respectively with live contacts 131—132. Each trolley has a soft iron armature 133, 134. As soon, therefore, as the ship starts to deviate from its course and contact is made, for instance, with live sector 131, not only is motor 25 started but magnet 129 is excited which throws the trolleys through a predetermined clockwise angle. The motor 25 will then have to run until the trolleys are turned back through this angle or, in other words, will have to run through a distance which would correspond to the amount of the lost motion in the preferred form of the invention. A similar action will take place when the ship starts to deviate in the other direction, but where the ship continues to deviate further by increments in the same direction the trolleys and the motor 25 are only moved a slight distance as in the preferred form of the invention.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and other omitted without interfering with the more general results outlined, and the invention extends to such use.

Having described my invention, what I claim and desire to secure by Letters Patent is:

1. In an automatic steering device, the combination with the usual reversible steering motor and course governing controller having a dead section for controlling the same, of an auxiliary controller having a narrower dead section than said first-named controller and positioned ahead of said first named controller, compass actuated means for actuating said auxiliary controller, and a small motor actuated from said auxiliary controller for directly actuating said first named controller.

2. In an automatic steering device, the combination with the usual reversible steering motor and course governing controller for controlling the same, of an auxiliary controller positioned ahead of said first named controller, compass actuated means for actuating said auxiliary controller, a small motor actuated from said auxiliary controller for actuating said first named controller, and a lost motion follow-up connection from said small motor to said auxiliary controller.

3. In an automatic steering device, the combination with the usual reversible steering motor and course governing controller having a dead section for controlling the same, of an auxiliary controller having a narrower dead section than said first-named controller and positioned ahead of said first named controller, compass actuated means for actuating said auxiliary controller at many times the rate of turn of the ship, and a small motor having a self-damped rotor actuated from said auxiliary controller for directly actuating said first named controller.

4. In an automatic steering device, the combination with the usual reversible steering motor and course governing controller for controlling the same, of an auxiliary controller positioned ahead of said first named controller, compass actuated means for actuating said auxiliary controller, a small motor actuated from said auxiliary controller for actuating said first named controller, a lost motion follow-up connection from said small motor to said auxiliary controller, a hand wheel also for actuating said first named controller, and a clutch between said auxiliary motor and the first named controlled operable from said hand wheel.

5. In an automatic steering device, the combination with the usual reversible steering motor and course governing controller for controlling the same, of an auxiliary controller positioned ahead of said first named controller, compass actuated means for actuating said auxiliary controller, a small motor actuated from said auxiliary controller for actuating said first named controller, a lost motion follow-up connection from said small motor to said auxiliary controller, a hand wheel also for actuating said first named controller, a clutch between said auxiliary motor and the first named controller operable from said hand wheel, and a lock also operable from said hand wheel for simultaneously locking the unclutched part.

6. As a means for increasing the closeness of rudder control in an automatic steering device for ships, the combination with a main controller and master compass, of an extra controller between the main controller and compass having a less effective dead section, and, an extra motor of small inertia actuated therefrom and having a driving connection to the main controller for turning the same.

7. As a means for increasing the closeness of rudder control in an automatic steering device for ships, the combination with a main controller and master compass, of an extra controller between the main controller and compass, an extra motor actuated therefrom for turning the main controller, a lost motion follow-up connection between said extra motor and the extra controller and hand means for changing course directly connected to said main controller whereby the course may be changed without interference in said lost motion connection.

8. In an automatic steering device, the combination with the usual reversible steering motor and course governing controller for controlling the same, of an auxiliary controller and hand wheel positioned ahead of said first named controller, compass actuated means for actuating said auxiliary controller, a small motor actuated from said auxiliary controller for directly actuating said first named controller, and means operable from the hand wheel for declutching the auxiliary controller.

9. As a means for increasing the sensitiveness of a non-hunting positional control of an object from a sensitive element, comprising a power motor for moving the object, a controller therefor, having a follow-up connection with the object and a dead section of sufficient width to prevent overrunning, a second controller turned from said sensitive element and having a narrow dead section, a small motor governed therefrom for turning said first named controller, and a follow-up connection between said small motor and the second controller having a lost motion connection therein of sufficient size to move the first controller off its dead section for every reversal of direction of the small motor.

10. As a means for increasing the sensitiveness of a non-hunting positional control of an object from a sensitive element, comprising a power motor for moving the object, a controller therefor having a follow-up connection with the object and a dead section of sufficient width to prevent overrunning, a second controller turned from said sensitive element and having a narrow dead section, a small motor governed therefrom for turning said first named controller, a follow-up connection between said small motor and the second controller, and a delayed action device for increasing the initial actuation of said small motor to move the first controller off its dead section.

11. In an automatic steering device, the combination with the usual reversible steering motor and course governing controller for controlling the same, of an auxiliary controller positioned ahead of said first named controller, compass actuated means for actuating said auxiliary controller, a small motor actuated from said auxiliary controller for actuating said first named controller, and a delayed action device for increasing the initial movement of said small motor in either direction after reversal.

12. As a means for increasing the closeness of rudder control in an automatic steering device for ships having a compass and main controller actuated therefrom, an extra controller between the main controller and compass, an extra motor actuated therefrom for turning the main controller, and an overthrow device for increasing the initial movement of said extra motor in either direction after reversal.

13. In an automatic steering device for ships subject to manual control, a compass-actuated controller, a small power motor actuated thereby, a follow-up connection from said motor to said controller including a lost motion device, a main controller actuated from said small motor, a steering engine actuated thereby, and a handwheel for changing course connected to said main controller whereby said lost motion device does not interfere with quick course changes.

14. In an automatic steering device, the combination with the usual reversible steering motor and course governing controller for controlling the same, of an auxiliary controller positioned ahead of said first named controller and having less effective dead section, compass actuated means for actuating said auxiliary controller, and a second reversible motor of much less inertia actuated from said auxiliary controller for actuating said first named controller.

15. In an automatic steering device, the combination with the usual reversible steering motor and course governing controller for controlling the same, of an auxiliary controller positioned ahead of said first named controller and having less effective dead section, compass actuated means for actuating said auxiliary controller, a second reversible motor of much less inertia actuated from said auxiliary controller for actuating said first named controller, and a lost motion follow-up connection from said second motor to said auxiliary controller whereby the main controller is moved off its dead section and the rudder moved upon slight initial deviations from course.

FREDERICK S. HODGMAN.